United States Patent [19]

Nakamura

[11] Patent Number: 5,329,601
[45] Date of Patent: Jul. 12, 1994

[54] SEMICONDUCTOR OPTICAL WAVEGUIDE TYPE SWITCH INCLUDING LIGHT CONTROL MEANS

[75] Inventor: Shigeru Nakamura, Tokyo, Japan

[73] Assignee: NEC Corporation, Tokyo, Japan

[21] Appl. No.: 993,698

[22] Filed: Dec. 21, 1992

[30] Foreign Application Priority Data

Dec. 20, 1991 [JP] Japan .................................. 3-355742

[51] Int. Cl.$^5$ ................................................ G02B 6/26
[52] U.S. Cl. ........................................ 385/41; 385/39; 385/40; 385/14; 385/2; 385/131; 385/132; 385/16
[58] Field of Search ................... 385/14, 15, 16, 39, 385/40, 41, 130, 131, 132, 1, 2, 3; 356/345, 350

[56] References Cited

U.S. PATENT DOCUMENTS

| | | | |
|---|---|---|---|
| 4,861,130 | 8/1989 | Katsuyama et al. | 385/2 X |
| 4,878,723 | 11/1989 | Chen et al. | 385/1 X |
| 4,904,039 | 2/1990 | Soref | 385/2 X |
| 4,957,337 | 9/1990 | Ogawa et al. | 385/1 X |
| 5,005,933 | 4/1991 | Shimuzu | 385/2 X |
| 5,105,240 | 4/1992 | Omura | 385/2 X |
| 5,247,594 | 9/1993 | Okuno et al. | 385/41 X |
| 5,249,243 | 9/1993 | Skeie | 385/41 X |

FOREIGN PATENT DOCUMENTS

| | | | |
|---|---|---|---|
| 1-224731 | 9/1989 | Japan | 385/40 X |
| 43125 | 8/1992 | Japan | 385/14 X |

OTHER PUBLICATIONS

Finders et al. "Composition of Selectively Grown In$_x$Ga$_{1-x}$As Structures from Locally Resolved Raman Spectroscopy", Journal of Crystal Growth 107, 1991.
R. Jin et al. "Picosecond All-Optical Switching in Single-Mode GaAs/AlGaAs Strip-Loaded Nonlinear Directional Couplers", Appl. Lett. 53, Nov. 1988.
R. Jin et al. "Ultrafast Modulation with Sub-pico-Second Recovery time in a GaAs/AlGaAs Nonlinear Directional Coupler", Appl. Phys. Lett. 56, 1990.
Y. D. Galeuchet et al. "Selective Area MOVPE of GaIn As/InP Heterostructures on Masked and Nonplanar (100) and {111} substrates", Journal of Crystal Growth 107, 1991.

Primary Examiner—Brian Healy

[57] ABSTRACT

A semiconductor waveguide type all-optical switch of a simple structure which can switch at high speed with low switching energy. A waveguide is formed within a core layer made of a semiconductor for absorbing controlling light when an electric field is applied, and a pair of electrodes are formed for applying a voltage to a waveguide part where a refractive index change is to be caused. The controlling light together with controlled light is entered in the waveguide. When a voltage is applied, Franz-Keldysh effect causes the wavelength at the optical absorption spectrum edge in the refractive index change part to shift to the long wavelength side. If light of a wavelength satisfying a predetermined condition is used as the controlling light, the controlling light is absorbed only in the refractive index change part for changing the refractive index in the part, thus the controlled light is switched. Preferably, a p-i-n structure is adopted.

18 Claims, 3 Drawing Sheets

SEMICONDUCTOR OPTICAL WAVEGUIDE TYPE SWITCH INCLUDING LIGHT CONTROL MEANS

BACKGROUND OF THE INVENTION

1. Field of the Invention

This invention relates to an optical switch used in fields of optical fiber communication, optical information processing, etc., and more particularly to a semiconductor waveguide type optical switch.

2. Description of the Related Art

An optical switch is one of optical circuit parts indispensable for switching terminals, optical fiber cables, etc., in an optical communication system and an optical information processing system. Among the optical switches, those of waveguide type are desirable from the viewpoints of easy integration and cascading. Hitherto, various waveguide type electro-optical switches such as the directional coupler, Mach-Zehnder, and total reflection types have been developed.

Two optical waveguides are disposed partially close to each other for the optical switch of the directional coupler type which uses an increase or decrease in the coupling degree between the two waveguides in the close portion or couple portion for switching the optical path from one of the waveguides to the other thereof. If the length of the couple portion equals to the "complete couple length" determined by the coupling strength, this optical switch causes the light emitting port to be switched in the couple portion thereof by inducing the difference between propagation constants on the two waveguides. The propagation constant change is caused by a change in the refractive index of one of the waveguides when an electric field is applied.

The optical switch of the Mach-Zehnder type has a structure where one waveguide is once branched into two portions which then are again coupled together. An electric field is applied to each branch of the waveguide to change the refractive index thereof, thereby generating a phase difference for the light passing through the branches. These branches of light are turned on or off in response to their phase differences when they are coupled together. The phase difference is caused by the refractive index change of each branch of the waveguide when the electric field is applied.

The optical switch of the total reflection type is made up of two waveguides which cross each other. An electric field is applied to the intersection of the waveguides to change the reflectance ratio, whereby total reflection within the waveguides is used to move a light on one of the waveguides to the other thereof. The reflectance ratio change is caused by the refractive index change of the waveguides when the electric field is applied.

With all the waveguide type electro-optical switches described above, an electric field is applied to the waveguide or waveguides to change the refractive index, however, recently an optical method has been watched as a method which has possibilities of switching operation at higher speed as compared with the waveguide type electro-optical switches. This optical method is to form a waveguide with a semiconductor and enter controlling light in the waveguide to cause the semiconductor to absorb the controlling light, thereby causing a refractive index change in any desired part of the waveguide.

With the above-described optical method, carriers are generated within the waveguide at the same time as the refractive index changes when the light is absorbed. To enable high-speed switching the carriers must be eliminated from within the waveguide for as short time as possible. Known as one of the methods for eliminating carriers to enable high-speed switching is a method of applying an electric field to the waveguide part where the refractive index is to be changed. (Refer to Japanese Non-Examined Patent Publication No. 4-3125 (Japanese Patent Application No. 2-104943)). Since the carriers are drawn out rapidly from the waveguide by the applied electric field, the recovery time from the refractive index change of the waveguide is shortened to enable high-speed switching.

To reduce switching energy, it is necessary for the controlling light to cause a sufficiently large change in the refractive index on to be made on the waveguide and also necessary for controlled light to be subjected to large phase modulation due to the refractive index change. For this purpose, it is preferably that the controlling light together with the controlled light is entered in the waveguide so as to change the phase of the controlled light. Further, it is preferable that the length of the waveguide part where the refractive index is to change is set long.

As described above, a semiconductor waveguide type optical switch requires that the controlling light entered together with the controlled light in the waveguide is absorbed in a predetermined part of the waveguide and pass through other parts thereof without absorption. In other words, the wavelength of the optical absorption edge in the predetermined part of the waveguide where the controlling light should be absorbed must be made shorter than the wavelength of the optical absorption edge in any other part thereof. To meet this requirement, it is possible to form the waveguide portion where the refractive index is to be changed and other portions thereof with semiconductors which differ in energy gap; however, this cannot easily be implemented.

SUMMARY OF THE INVENTION

Accordingly, it is an object of this invention to provide a semiconductor waveguide type optical switch of a simple structure which can be easily made and can switch controlled light at high speed by absorbing the controlling light in a predetermined part thereof.

A semiconductor waveguide type optical switch of this invention comprises at least one optical waveguide formed within a core layer made of a semiconductor for absorbing controlling light upon application of an electric field and a pair of electrodes for applying the electric field to a part of the waveguide where a refractive index change is to be caused by absorbing the controlling light. The controlling light together with the light being controlled is entered in the waveguide.

With the semiconductor waveguide type optical switch of this invention, when a DC voltage is applied to the pair of the electrodes, Franz-Keldysh effect causes the wavelength at the edge of an optical absorption spectrum in the refractive index change part of the waveguide to shift to the long wavelength side as compared with when no voltage is applied. Therefore, assuming that the wavelength at the optical absorption spectrum edge in the refractive index change part is $\lambda^1$ and the wavelength at the optical absorption spectrum edge in any other part thereof is $\lambda^2$, if the controlling light of the wavelength $\lambda$ satisfying the condition "$\lambda^1 > \lambda > \lambda^2$" is entered in the waveguide, the controlling light is absorbed in the refractive index change part and the refractive index of the part changes. In other parts, the controlling light passes through and no refractive index change occurs. Thus, the controlled light can be switched at the voltage-applied part by absorbing the controlling light.

Since the controlling light together with the controlled light is entered in the waveguide, interaction length is long, thus the switching is performed with low energy. Further, the electric field applied to the refractive index change part of the waveguide has an effect of drawing out carriers generated within the waveguide by absorbing the light for shortening the recovery time from the refractive index change. Therefore, the optical switch of this invention can perform switching at higher speed.

The optical switch of this invention has an extremely simple structure because the pair of the electrodes for applying a voltage only need to be formed, which needs not adopt a complicated and difficult structure such as a combination of semiconductors which differ in band gap from each other.

According to a preferred embodiment of this invention, there is provided a semiconductor waveguide type optical switch of a so-called directional coupler type, which comprises a plurality of waveguides within the core layer and parts of the waveguides are made close to each other to form a couple portion. Preferably, the electrode pair are disposed so as to put the couple portion therebetween near the couple portion.

Preferably, an electric field generated by a voltage applied to the pair of the electrodes is directed so that the electric field is applied substantially parallel to or substantially perpendicular to a core layer. To generate an electric field substantially parallel to the core layer, the electrodes are disposed, for example, so as to put the couple portion therebetween.

To generate an electric field substantially perpendicular to the core layer, the electrodes are disposed so as to put the waveguides therebetween; for example, one of the electrodes is disposed on the surface of a semiconductor cladding layer and the other is disposed on the back of a semiconductor substrate supporting the core layer and the cladding layer. In this case, preferably, the electrode disposed on the surface of the cladding layer is arranged only in the refractive index change part of the waveguide and is electrically insulated from areas other than the refractive index change part.

According to another embodiment of this invention, there is provided a semiconductor waveguide type optical switch of a so-called p-i-n structure, in which the core layer is made of a non-doped semiconductor and is put between a p+-type semiconductor cladding layer and an n+-type semiconductor cladding layer. In this case, preferably, one of the pair of the electrodes is disposed on a surface of one of the semiconductor cladding layers and the other thereof is disposed on the back of the semiconductor substrate so as to generate an electric field substantially perpendicular to the core layer, and a DC voltage is applied so that the voltage becomes reverse bias to the pair of the electrodes. Generally, a larger electric field can be applied to p-i-n structure waveguides than to waveguides of non-p-i-n structure, thus an advantage of switching at still higher speed is obtained.

Preferably, first and second optical waveguides are provides within the core layer. The first waveguide is once branched into at least two portions and thereafter said portions coupled together again and controlled light is propagated therein. The second waveguide is connected to the first waveguide and controlling light is propagated therein. The pair of said electrodes are disposed so as to apply an electric field to at least one of the branched portions of the first waveguide.

DESCRIPTION OF THE PREFERRED EMBODIMENTS

Referring now to the accompanying drawings, preferred embodiments of this invention will be described.

First Embodiment

Figure 1:
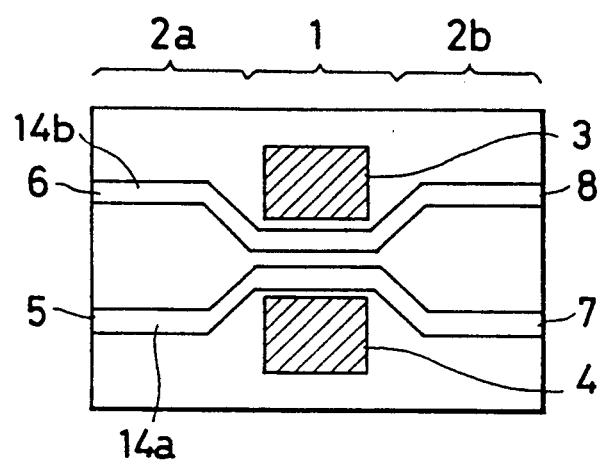
FIG. 1 is a plan view of a semiconductor waveguide type optical switch according to a first embodiment of this invention.
Figure 2:
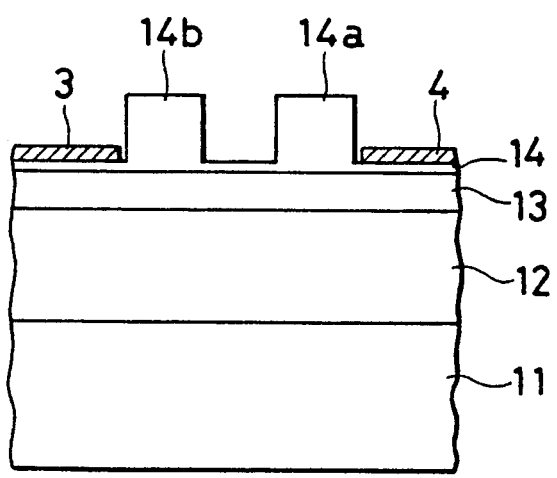
FIG. 2 is a partially sectional view of a couple portion of the optical switch of the first embodiment.

A semiconductor waveguide type optical switch according to a first embodiment of this invention shown in FIGS. 1 and 2 is of directional coupler type having two optical waveguides of a so-called strip-loaded structure.

FIG. 2 shows the partial section crossing at right angles to the strip-loaded waveguides of the optical switch. As shown in FIG. 2, on a GaAs substrate 11, a lower cladding layer 12 (2.5 $\mu$m thick) made of non-doped $Al_xGa_{1-x}As$ (x=0.07), a core layer 13 (0.5 $\mu$m thick) made of non-doped GaAs, and an upper cladding layer 14 made of non-doped $Al_xGa_{1-x}As$ (x=0.07) are laminated in this order. The upper cladding layer 14 has two ribs 14a and 14b (each 0.9 $\mu$m high and 2 $\mu$m wide) and the portion of the layer 14 in which the ribs 14a and 14b do not exist has a thickness of 0.1 $\mu$m. First and second optical waveguides are formed within the core layer 13 just below the ribs 14a and 14b respectively.

As shown in FIG. 1, the optical swtich of the first embodiment is composed of a couple portion 1 at the approximate center and non-couple portions 2a and 2b on both sides thereof. The ribs 14a and 14b, or the first and second waveguides, are located in parallel to each other in the couple portion 1 and the non-couple portions 2a and 2b except the junction with the couple portion 1, and the distance between the waveguides in the couple portion 1 is shorter than that in the non-couple portion 2a or 2b. The distance between the waveguides in the couple portion 1 is 2 $\mu$m. Further, the couple portion 1 is provided with a pair of electrodes 3 and 4 so as to put the waveguides between them on the surface of the upper cladding layer 14. These electrodes 3 and 4 are provided to apply an electric field to the waveguides in the couple portion 1.

With the optical switch, when a DC voltage is applied between the electrodes 3 and 4, an electric field is applied to the strip-loaded waveguides in the couple portion 1. Thus, Franz-Keldysh effect causes the edge of an optical absorption spectrum of the core layer 13 made of non-doped GaAs to shift to the long wavelength side.

For example, if light having a wavelength of 890 nm and light having a wavelength of 910 nm are used respectively as controlling light and controlled light and a pulse of the controlling light together with the controlled light is entered through an entrance 5 of the first waveguide below the rib 14a, both the controlling light and the controlled light pass through the non-couple portion 2a without absorption and only the controlling light is absorbed in the couple portion 1 to which an electric field of around $10^4$ V/cm is applied, thereby switching the path of the controlled light.

The controlled light entered through the entrance 5 of the first waveguide is designed to exit from an exit 8 of the second waveguide below the rib 14b when no controlling light pulse is entered. When the controlling light pulse is entered into one of the waveguides and absorbed in the couple portion, the controlled light changes in phase due to a refractive index change of the waveguide in the couple portion 1, and as a result, the controlled light is switched in the couple portion 1 to the first waveguide and exits from an exit 7 thereof.

As described above, although the optical switch of the first embodiment comprises the couple portion 1 and non-couple portions 2a and 2b which are made of the same semiconductor and has a simple structure where the pair of the electrodes 3 and 4 are only provided so as to put the waveguides between them in the couple portion 1, the switch can switch the path of the controlled light at high speed by absorbing the controlling light nevertheless.

Second embodiment

Figure 3:
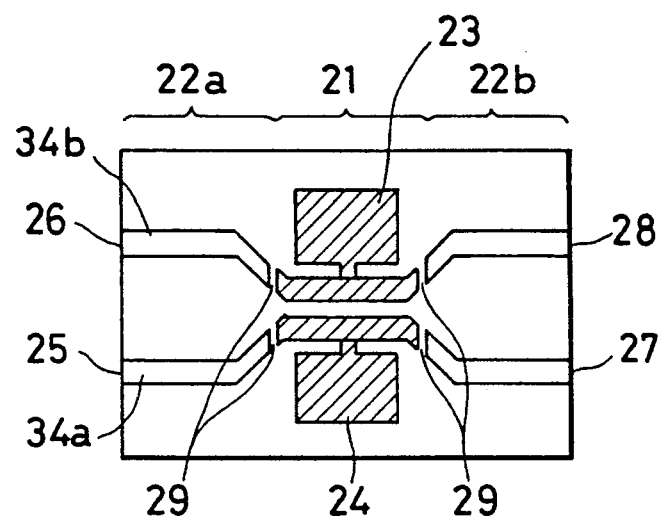
FIG. 3 is a plan view of a semiconductor waveguide type optical switching according to a second embodiment of this invention.
Figure 4:
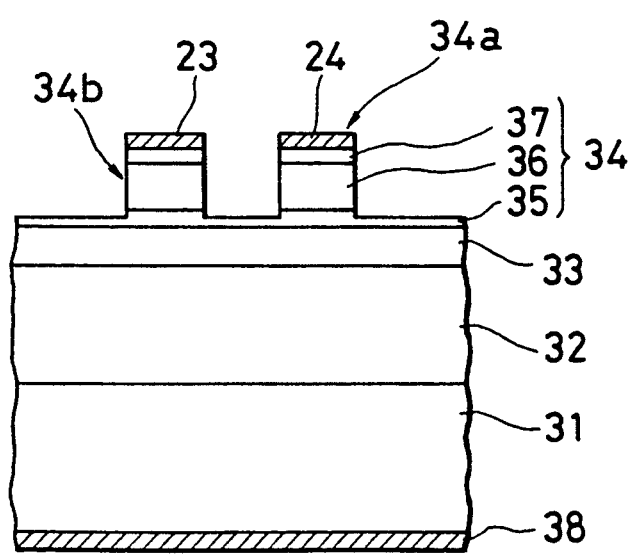
FIG. 4 is a partially sectional view of a couple portion of the optical switch of the second embodiment.
Figure 5:
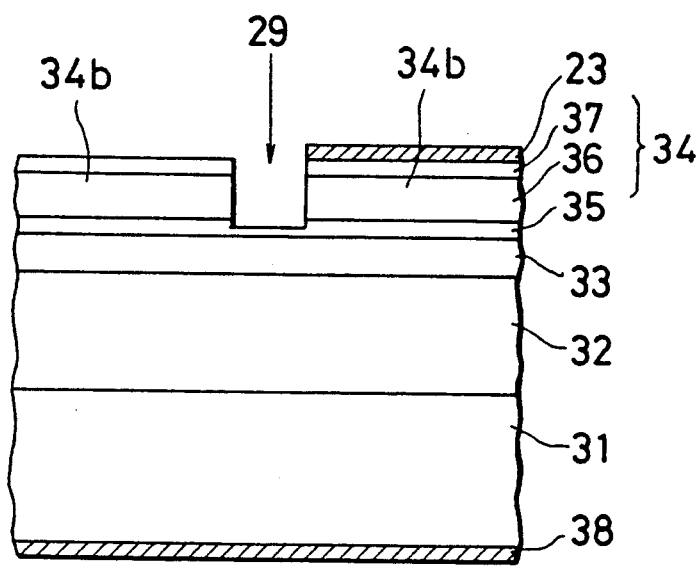
FIG. 5 is a partially sectional view around grooves of the optical switch of the second embodiment.

FIGS. 3 to 5 show a semiconductor waveguide type all-optical switch according to a second embodiment of this invention. The optical switch of the second embodiment is also of the same directional coupler type as in the first embodiment, and also has two waveguides of the strip-loaded structure as in the first embodiment.

In FIG. 4 showing a similar section to that in FIG. 2, on an n+-type GaAs substrate 31 with Si—doped in concentration of $10^{18}$ cm$^{-3}$, a lower cladding layer 32 (2.5 μm thick) made of n+-type $Al_xGa_{1-x}As$ (x=0.07) with Si—doped in concentration of $10^{18}$ cm$^{-3}$ and a core layer 33 (0.5 μm thick) made of non-doped GaAs are laminated in this order. On the core layer 33, a non-doped $Al_xGa_{1-x}As$ layer 35 (x=0.07, 0.2 μm thick), a p+-type $Al_xGa_{1-x}As$ layer 36 (x=0.07, 0.6 μm thick) with Be—doped in concentration of $10^{18}$ cm$^{-3}$, and a p+-type GaAs layer 37 (0.2 μm thick) with Be—doped in concentration of $10^{18}$ cm$^{-3}$ are laminated in this order. These three layers 35, 36, and 37 constitute an upper cladding layer 34.

The upper cladding layer 34 has two ribs 34a and 34b (each 0.9 μm high and 2 μm wide) and the portion thereof in which the ribs 34a and 34b do not exist has a thickness of 0.1 μm. First and second optical waveguides are formed within the core layer 33 just below the ribs 34a and 34b, respectively.

As shown in FIG. 3, the optical switch of the second embodiment also composed of a couple portion 21 at the approximate center and non-couple portions 22a and 22b on both sides thereof. The form and disposition of the ribs 34a and 34b, that is, the first and second waveguides are the same as in the first embodiment.

On the surface of the p+-type GaAs layer 37 constituting a part of the upper cladding layer 34, electrodes 23 and 24 are provided. Unlike the first embodiment, the electrodes 23 and 24 are formed on the top surfaces of the ribs 34a and 34b in the couple portion 21 and have pads, respectively.

An electrode 38 is formed on the entire back surface of the n+-type GaAs substrate 31.

On the boundaries between the couple portion 21 and non-couple portions 22a and 22b, four grooves 29 each being 2 μm wide are formed crossing the ribs 34a and 35a, as shown in FIGS. 4 and 5. The depth of each of these grooves 29 is the same as the height of each of the ribs 34a and 34b in the couple portion 21. In other words, the bottom of each of the grooves 29 reaches the surface of the i-type $Al_xGa_{1-x}As$ layer 35 in the couple portion 21.

The ribs 34a and 34b are separated by the grooves 29 into the couple portion 21 and non-couple portions 22a and 22b. Thus, the p+ doped layers of the upper cladding layer 34, that is, the p+-type $Al_xGa_{1-x}As$ layer 36 and the p+-type GaAs layer 37 are discontinuous between the couple portion 21 and non-couple portions 22a and 22b. The electrodes 23 and 24 reach the grooves 29 on both sides thereof on the surfaces of the ribs 34a and 34b.

With the optical switch, if a voltage is applied between the p+-side electrodes 23 and 24 and the n+-side electrode 38, an electric field vertical to the waveguides and the substrate 31 is applied only to the couple portion 21 because the couple portion 21 is electrically insulated by the grooves 29 from the non-couple portions 22a and 22b. If a DC voltage of the same value is applied between the electrodes 23 and 38 and between the electrodes 24 and 38, the propagation constants on both of the waveguides are made equal to each other even in the voltage application state.

For example, if light having a wavelength of 890 nm and light having a wavelength of 930 nm are used respectively as controlling light and controlled light and a pulse of the controlling light together with the controlled light is entered through an entrance 25 of the first waveguide below the rib 34a, both of the controlling light and the controlled light pass through the non-couple portion 22a without absorption and only the controlling light is absorbed in the couple portion 21 to which an electric field of around $10^4$ V/cm is applied, thereby switching the path of the controlled light.

The controlled light entered through the entrance 25 of the first waveguide is designed to exit from an exit 28 of the second waveguide below the rib 34b when no controlling light pulse is entered. When the controlling light pulse is entered into one of the waveguides and absorbed in the couple portion 21, the controlled light changes in phase due to a refractive index change of the waveguides in the couple portion 21, and as a result, the controlled light is switched in the couple portion 21 to the first waveguide and exits from an exit 27 thereof.

Since the optical switch of the second embodiment adopts a p-i-n structure, a larger electric field than that in the first embodiment can be applied to the waveguides, as a result, the effect of shortening the recovery time from a refractive index change also increases, thus enabling switching at higher speed than in the first embodiment.

Third embodiment

Figure 6:
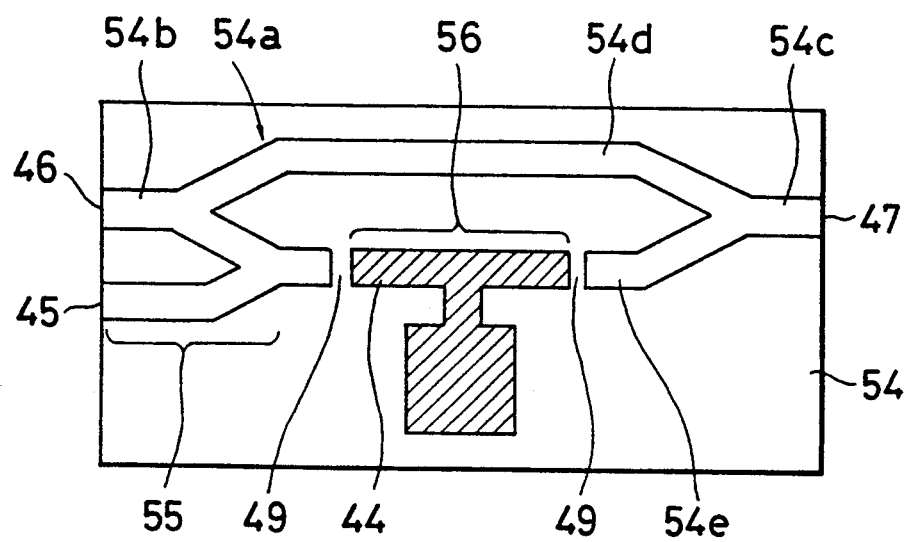
FIG. 6 is a plan view of a semiconductor waveguide type optical switch according to a third embodiment of this invention.

FIG. 6 shows a semiconductor waveguide type all-optical switch according to a third embodiment of this invention, which is of Mach-Zehnder type.

The optical switch of this embodiment has a same structure of layers as that of the second embodiment. That is, on an n+-type GaAs substrate with Si-doped in concentration of $10^{18}$ cm$^{-3}$, a lower cladding layer (2.5 μm thick) made of n+-type Al$_x$Ga$_{1-x}$As (x=0.07) with Si-doped in concentration of $10^{18}$ cm$^{-3}$ and a core layer (0.5 μm thick) made of non-doped GaAs are laminated in this order. On the core layer, a non-doped Al$_x$Ga$_{1-x}$As layer (x=0.07, 0.2 μm thick), a p+-type Al$_x$Ga$_{1-x}$As layer (x=0.07, 0.6 μm thick) with Be-doped in concentration of $10^{18}$ cm$^{-3}$, and a p+-type GaAs layer (0.2 μm thick) with Be-doped in concentration of $10^{18}$ cm$^{-3}$ are laminated in this order, which constitute an upper cladding layer 54.

The upper cladding layer 54 has such ribs 54a and 55 as shown in FIG. 6. The rib 54a is once branched into two portions which then are again coupled together. That is, the rib 54a comprises a non-branched portion 54b, branches 54d and 54e and a non-branched portion 54b, which are each of 0.9 μm in height and 2 μm in width. A first optical waveguide which propagates controlled light is formed within the core layer just below the rib 54a, so that the first waveguide is once branched into two portions which then are again coupled together. The rib 55 is connected to the rib 54a at the branch 54e. A second optical waveguide which propagates controlling light is formed within the core layer just below the rib 55.

The branch 54e of the rib 54a is separated by two grooves 49 each of which is 2 μm width to form a portion 56. The depth of the grooves 49 is equal to the height of the rib 54a, in other words, the bottom of each of the grooves 49 reaches the i-type Al$_x$Ga$_{1-x}$As layer. An electrode 44 is formed on the top surface of the portion 56 and connected to a pad on the top surface of the i-type Al$_x$Ga$_{1-x}$As layer. Another electrode (not shown) is formed on the entire back surface of the substrate similar to the first and second embodiment. The controlling light is absorbed within the first waveguide just below the portion 56.

With the optical switch of the third embodiment, if a voltage is applied between the p+-side electrodes 44 and the n+-side electrode, and electric field vertical to the waveguides and the substrate is applied only to the portion 56.

For example, light having a wavelength of 890 nm and light having a wavelength of 930 nm are used respectively as controlling light and controlled light. And a pulse of the controlling light is entered through an entrance 45 of the second waveguide and the controlled light is entered through an entrance 46 of the first waveguide. The controlled light is once branches into two portions and thereafter coupled again in the first waveguide. The controlling light propagates in the second and first waveguides to be absorbed at a position just below the portion 56. Thus the refractive index of the portion 56 is changed and as a result, the controlled light is turned on or off in response to the phase difference between the both of the branched controlled lights when the branched lights are coupled together again.

Therefore, in case that the controlled light is designed to be turned on and exit from an exit 47 when no controlling light pulse is entered, if the controlling light pulse is entered and absorbed in the waveguide just below the portion 56, the controlled light is turned off and no controlled light exit from the exit 47.

Since the optical switch of the third embodiment also adopts a p-i-n structure, the same effect as in the second embodiment is obtained.

Although the optical switches of the directional coupler and Mach-Zehnder types using the GaAs-AlGaAs system as semiconductor material are described above in the embodiments, this invention is not limited to the description. Other semiconductor materials having a similar nature to that of the GaAs-AlGaAs system may also be used and other types may also be adopted.

In addition, although the optical waveguides are of the strip—loaded structure in the embodiments, other structures, such as a ridge or buried structure, may also be adopted.

What is claimed is:

1. A semiconductor waveguide type optical switch comprising:
   at least one optical waveguide formed within a core layer made of a semiconductor for absorbing controlling light; and
   a pair of electrodes for applying a static electric field to a part of said waveguide where a refractive index change is to be caused by absorbing said controlling light;
   said controlling light being entered into said waveguide together with light to be controlled wherein said controlling light is selectively absorbed at said part and said light to be controlled is propagated through said part, resulting in a switching operation of said light to be controlled.

2. The semiconductor waveguide type optical switch as claimed in claim 1, comprising a plurality of said waveguides within said core layer, and parts of said plurality of waveguides being disposed close to each other to form a couple portion for constituting a directional coupler;
   wherein said pair of said electrodes are disposed so as to apply said static electric field to said couple portion.

3. The semiconductor waveguide type optical switch as claimed in claim 2, wherein said pair of said electrodes are disposed on a semiconductor cladding layer such that each of said electrodes is positioned at each side of said couple portion, respectively, and adjacent said couple portion.

4. The semiconductor waveguide type optical switch as claimed in claim 3, wherein one of said electrodes is disposed on a surface of said semiconductor cladding layer and the other of said electrodes is disposed on a back surface of a semiconductor substrate for supporting said core layer and said cladding layer and wherein said static electric field is substantially perpendicular to said core layer and is generated by a voltage applied to said pair of electrodes.

5. The semiconductor waveguide type optical switch as claimed in claim 4, wherein said electrode disposed on the surface of said semiconductor cladding layer is arranged only in said part of said waveguide where the refractive index is to be changed, and is electrically insulated from areas other than said part.

6. The semiconductor waveguide type optical switch as claimed in claim 1, wherein said core layer is made of a semiconductor of no impurity-doped material and is disposed between a p+-type semiconductor cladding layer and an n+-type semiconductor cladding layer positioned at both sides of said core layer.

7. The semiconductor waveguide type optical switch as claimed in claim 6, wherein one of said electrodes is disposed on a surface of one of said semiconductor cladding layers and the other of said electrodes is disposed on a back surface of a semiconductor substrate, and a DC voltage is applied to said pair of electrodes so that said voltage is a reverse bias to said $p^+$-type and $n^+$-type semiconductor cladding layers for generating said static electric field substantially perpendicular to said core layer.

8. The semiconductor waveguide type optical switch as claimed in claim 7, wherein said electrode disposed on said surface of one of said semiconductor cladding layers is arranged only in said part of said waveguide where the refractive index is to be changed, and is electrically insulated from areas other than said part.

9. The semiconductor waveguide type optical switch as claimed in claim 1, comprising first and second optical waveguides within said core layer wherein:
   said first waveguide is at a beginning thereof branched into at least two portions and thereafter said two portions are coupled together, said light to be controlled being propagated through said first waveguide, and said second waveguide is connected to said first waveguide, said controlling light being propagated through said second waveguide, and
   said pair of electrodes are disposed so as to apply said static electric field to at least one of said branched portions of said first waveguide.

10. A semiconductor waveguide type optical switch comprising:
    a semiconductor substrate;
    a first semiconductor cladding layer formed on said substrate;
    a semiconductor core layer formed on said first cladding layer;
    a second semiconductor cladding layer formed on said core layer, said second cladding layer having a first rib and a second rib disposed on a surface of said second cladding layer;
    said core layer having inside thereof a first optical waveguide and a second optical waveguide disposed under said first and second ribs, respectively;
    said first and second waveguides having a couple portion where refractive index change is to be caused; and
    a pair of electrodes for applying a static electric field to said couple portion,
    wherein a DC voltage is applied between said pair of electrodes, controlling light is entered into at least one of said first and second waveguides together with light to be controlled, and said controlling light is selectively absorbed at said couple portion and said light to be controlled is propagated through said couple portion, resulting in a switching operation of said light to be controlled.

11. A semiconductor waveguide type optical switch comprising:
    a semiconductor substrate;
    a first semiconductor cladding layer formed on said substrate;
    a semiconductor core layer formed on said first cladding layer;
    a second semiconductor cladding layer formed on said core layer, said second cladding layer having a first rib and a second rib disposed on a surface of said second cladding layer;
    said core layer having inside thereof a first optical waveguide and a second optical waveguide disposed under said first and second ribs, respectively;
    said first and second waveguides having a couple portion where refractive index change is to be caused; and
    a pair of first electrodes for applying a static electric field to said couple portion;
    said pair of first electrodes being formed on a surface of said second cladding layer and each of said first electrodes being disposed at each respective side of said couple portion; and
    a second electrode for applying said static electric field to said couple portion;
    said second electrode being formed on a back surface of said substrate;
    wherein a DC voltage is applied between said pair of first electrodes and said second electrode, controlling light is entered into at least one of said first and second waveguides together with light to be controlled, and said controlling light is selectively absorbed at said couple portion and said light to be controlled is propagated through said couple portion, resulting in a switching operation of said light to be controlled.

12. A semiconductor waveguide type optical switch comprising:
    a semiconductor substrate;
    a first semiconductor cladding layer formed on said substrate;
    a semiconductor core layer formed on said first cladding layer;
    a second semiconductor cladding layer formed on said core layer, said second cladding layer having a first rib and a second rib disposed on a surface of said second cladding layer;
    said core layer having inside thereof a first optical waveguide and a second optical waveguide disposed under said first and second ribs, respectively;
    said first waveguide being branched at a beginning thereof into two portions and thereafter said portions being coupled together, light to be controlled being entered and propagated through said first waveguide;
    said second waveguide being connected to said first waveguide at a branched portion thereof, controlling light being entered and propagated through said second waveguide to said branched portion;
    said first waveguide having at said branched portion thereof a portion where refractive index change is to be caused;
    a first electrode formed on a surface of said second cladding layer;
    said first electrode being disposed above said portion where refractive index change is to be caused; and
    a second electrode formed on a back surface of said substrate, wherein:
    a DC voltage is applied between said first and second electrodes for applying said static electric field to said portion where refractive index change is to be caused, and
    wherein said light to be controlled is entered into and propagated through said first waveguide, and said controlling light is entered into and propagated through said second waveguide and is then selectively absorbed at said portion, resulting in a switching operation of said light to be controlled.

13. The semiconductor waveguide type optical switch as claimed in claim 10, wherein said core layer is made of a semiconductor of no impurity-doped material and is disposed between a p+-type semiconductor cladding layer and an n+-type semiconductor cladding layer positioned at both sides of said core layer.

14. The semiconductor waveguide type optical switch as claimed in claim 13, wherein one of said electrodes is disposed on a surface of one of said semiconductor cladding layers and the other of said electrodes is disposed on a back surface of a semiconductor substrate, and a DC voltage is applied to said pair of electrodes so that said voltage is a reverse bias to said p+-type and n+-type semiconductor cladding layers for generating said static electric field substantially perpendicular to said core layer.

15. The semiconductor waveguide type optical switch as claimed in claim 1, wherein said light to be controlled is selected from signal light or incident light.

16. The semiconductor waveguide type optical switch as claimed in claim 10, wherein said light to be controlled is selected from signal light or incident light.

17. The semiconductor waveguide type optical switch as claimed in claim 11, wherein said core layer is made of a semiconductor of no impurity-doped material and wherein said first cladding layer is a p+-type semiconductor cladding layer and said second cladding layer is an n+-type semiconductor cladding layer.

18. The semiconductor waveguide type optical switch as claimed in claim 17, wherein one of said electrodes is disposed on a surface of one of said semiconductor cladding layers and the other of said electrodes is disposed on a back surface of a semiconductor substrate, and said DC voltage is applied between said first and second electrodes so that said voltage is a reverse bias to said p+-type and n+-type semiconductor cladding layers for generating said static electric field substantially perpendicular to said core layer.

* * * * *